United States Patent
Jia et al.

(10) Patent No.: US 10,560,913 B2
(45) Date of Patent: Feb. 11, 2020

(54) METHOD, DEVICE, AND SYSTEM FOR ACQUISITION OF CONTROL NODE INFORMATION

(71) Applicant: CHINA ACADEMY OF TELECOMMUNICATIONS TECHNOLOGY, Beijing OT (CN)

(72) Inventors: Beibei Jia, Beijing (CN); Dajun Zhang, Beijing (CN); Yi Yang, Beijing (CN); Wei Bao, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 13/691,750

(22) Filed: Dec. 1, 2012

(65) Prior Publication Data
US 2013/0163504 A1    Jun. 27, 2013

Related U.S. Application Data

(63) Continuation of application No. PCT/CN2011/078305, filed on Aug. 11, 2011.

(30) Foreign Application Priority Data

Aug. 12, 2010    (CN) .......................... 2010 1 0251867
Sep. 29, 2010    (CN) .......................... 2010 1 0296503

(51) Int. Cl.
*H04W 72/04*    (2009.01)
*H04W 60/00*    (2009.01)

(52) U.S. Cl.
CPC .................. *H04W 60/00* (2013.01)

(58) Field of Classification Search
CPC ... H04W 88/08; H04W 92/20; H04W 72/042; H04W 52/0206; H04W 72/0426; H04W 84/045; H04W 92/045
See application file for complete search history.

(56) References Cited

U.S. PATENT DOCUMENTS

2009/0086864 A1*   4/2009   Komninakis ............ H04B 1/10
                                                              375/346
2010/0260096 A1*  10/2010   Ulupinar .............. H04B 7/2606
                                                              370/315
(Continued)

FOREIGN PATENT DOCUMENTS

| CN | 101257707 | 9/2008 |
|---|---|---|
| CN | 101483550 | 7/2009 |

(Continued)

OTHER PUBLICATIONS

PCT International Written Opinion and ISR dated from PCT/CN2011/078305 dated Nov. 24, 2011, and its English translation from WIPO.
(Continued)

*Primary Examiner* — Mansour Oveissi
(74) *Attorney, Agent, or Firm* — Ladas & Parry, LLP

(57) ABSTRACT

Disclosed are a method, a device, and a system for the acquisition of control node information. In embodiments of the present invention, on the basis of information transmitted by a base station, a relay node acquires control node information on user terminal access attached in the information acquired, thereby allowing a relay node in a system placed after the introducing relay node to be informed of the control node information on user terminal access.

9 Claims, 10 Drawing Sheets

(56) References Cited

U.S. PATENT DOCUMENTS

| | | | | |
|---|---|---|---|---|
| 2010/0322146 | A1* | 12/2010 | Liu | H04B 7/155 370/315 |
| 2012/0071190 | A1* | 3/2012 | Choi | H04L 5/0037 455/517 |
| 2012/0190368 | A1* | 7/2012 | Zhang | H04W 36/0055 455/436 |
| 2012/0295558 | A1* | 11/2012 | Wang | H04B 1/109 455/79 |
| 2013/0310023 | A1* | 11/2013 | Bevan | H04B 1/1027 455/423 |

FOREIGN PATENT DOCUMENTS

| | | |
|---|---|---|
| CN | 101521871 | 9/2009 |
| CN | 101657028 | 2/2010 |

OTHER PUBLICATIONS

PCT International Preliminary Report on Patentability Chapter I from PCT/CN2011/078305 dated Feb. 12, 2013 and its English translation from WIPO.

EPO Communication dated Dec. 14, 2016 with Extended European Search Report dated Dec. 14, 2016 for European Patent Application No. 11816112.4.

Huawei: "Consideration on HO type choosing issue", 3GPP Draft; R3-101867 Consideration on HO Type Choosing Issue_HW, 3rd Generation Partnership Project (3GPP), Mobile Competence Centre; 650, Route Des Lucioles; F-06921 Sophia-Antipolis Cedex; France, vol. RAN WG3, No. Beijing; Jun. 29, 2010, Jun. 23, 2010 (Jun. 23, 2010), XP050453780.

Catt et al: "Discussion on MME addressing issue during X2 handover procedure", 3GPP Draft; R3-101881, 3rd Generation Partnership Project (3GPP), Mobile Competence Centre; 650, Route Des Lucioles; F-06921 Sophia-Antipolis Cedex; France, vol. RAN WG3, No. Beijing; Jun. 29, 2010, Jun. 23, 2010 (Jun. 23, 2010), XP050453792.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; stage 2 (Release 10)", 3GPP Standard; 3GPP TS 36.300, 3rd Generation Partnership Project (3GPP), Mobile Competence Centre; 650, Route Des Lucioles; F-06921 Sophia-Antipolis Cedex; France, No. V10.0.0, Jun. 17, 2010 (Jun. 17, 2010), pp. 1-183, XP050441905.

Catt: "Discussion on choice of HO type", 3GPP Draft; R3-102220, 3rd Generation Partnership Project (3GPP), Mobile Competence Centre; 650, Route Des Lucioles; F-06921 Sophia-Antipolis Cedex; France, vol. RAN WG3, No. Madrid, Spain; Aug. 23, 2010, Aug. 15, 2010 (Aug. 15, 2010), XP050453096.

Motorola et al: "Offline report on Neighbor cells handling and HO type determination", 3GPP Draft; R3-102602 Offline Report on Neighbor Cells Handling and HO Type Determination_R1.0, 3rd Generation Partnership Project (3GPP), Mobile Competence Centre; 650, Route Des Lucioles; F-06921 Sophia-Antipolis Cedex; France, vol. RAN WG3, No. Xi' an, P.R. China; Oct. 11, 2010-Oct. 10, 2010, Oct. 2, 2010 (Oct. 2, 2010), XP050610275.

Office action dated Jun. 26, 2013 from corresponding CN Patent Application No. 201010296503 and its English translation provided by the applicants.

Office action dated Feb. 25, 2014 from corresponding CN Patent Application No. 201010296503 and its English translation provided by the applicants.

Office action dated Jul. 18, 2014 from corresponding CN Patent Application No. 201010296503 and its English translation provided by the applicants.

Written Opinion and ISR from related PCT/CN2011/078305 and its English translation.

Catt: "GUMMEI Information for Handover Type Determination", 3GPP TSG-RAN WG3Meeting #69bis, R3-102691, Oct. 15, 2010. Technical Specification Group Radio Access Network: 3GPP TS 36.300 V10.3.0: Evolved Universal Terrestrial Radio Access (E-UTRA) and Evolved Universal Terrestrial Radio Access Network (Eo-UTRAN); Overall Description; Stage 2 (Release 10) $3^{rd}$ Generation Partnership Project (3GPP): Technical Specification (TS), vol. 36.300, No. 10.3.0.

* cited by examiner

METHOD, DEVICE, AND SYSTEM FOR ACQUISITION OF CONTROL NODE INFORMATION

CROSS REFERENCE TO RELATED APPLICATIONS

This application is a continuation of PCT/CN2011/078305 filed on Aug. 11, 2011, which claims priority to Chinese Patent Application No. 201010251867.6 filed in the Patent Office of the People's Republic of China on Aug. 12, 2010, and to Chinese Patent Application No. 201010296503.X filed in the Patent Office of the People's Republic of China on Sep. 29, 2010 entitled "Method, Device, and System for Acquisition of Control Node Information" the disclosures of which are hereby incorporated by reference in their entireties.

FIELD OF THE INVENTION

The present invention relates to the field of communication, in particular to the method, device and system for acquisition of control node information.

BACKGROUND OF THE PRESENT INVENTION

Due to higher cost of base station generally, the construction of numerous base station will lead to higher net laying cost in the development of 3G technology ($3^{rd}$ generation mobile communication). For the purpose of reducing the cost, relay is introduced into the cellular communication system gradually to extend the coverage area of base station signal. FIG. 1a is overall LTE-A network architecture with deployed Relay Node (RN), which is wirelessly connected to the core network via the donor cell under a Donor Evolved Node B (DeNB). There is no direct wired interface between the RN and core network and each RN can manage one or more cells. In this architecture, the interface between User Equipment (UE) and RN is called Uu interface, while that between RN and DeNB is Un interface. One DeNB can have several RNs connected, while one RN can only connected to one DeNB.

FIG. 1b is the structure chart of LTE-A system after introduction of RN. S1 interface has one end connected to the node eNB in E-UTRAN (Evolved UTRAN) and the other connected to the node MME/S-GW (Mobility Management Entity/Serving Gateway) in EPC (Evolved Packet Core), or one end connected to eNB and the other, to RN. S1 interface provides the access to radio resource in radio access network, including control plane function and user plane function.

Control plane interface of S1 (S1-MME) provides the application protocol between eNB and MME, and the signaling bearing function used for transferring application protocol message, while the user plane interface of S1 (S1-U) provides the user plane data transmission function between eNB and S-GW. S1 interface mainly includes the following functions: E-RAB (E-UTRAN Radio Access Bearer) management function; mobility management function; paging function; NAS (Non-Access Stratum) signaling transmission function; LPPa (LTE Positioning Protocol A) signaling transmission function; S1 interface management function; network sharing function, roaming and regional lockout support function; NAS node selection function; initial context setup function; UE context modification function; MME load balancing function; position report function; PWS (Public Warning System) message transmission function; overload function; RAN (Radio Access Network) message management function; configuration transmission function; S1 CDMA2000 tunnelling function, etc.

X2 interface is between nodes eNB or eNB and RN in E-UTRAN, and X2 interface of many-to-many connections exists between eNBs, so there may be the possibility that all eNBs within a certain area have X2 connection. The existence of X2 interface is mainly to support the mobility management function of UE under connection status; besides, it is also functioned as load management function, cell interference coordination function, general X2 management and error control function, etc.

As shown in FIG. 2, the start-up procedure of RN can be described as: RRC (Radio Resource Control) connection established between RN and DeNB; attach request sent to MME by RN; RN signing data acquired by MME from HSS (Home Subscriber Server), and verification on RN; in case the verification is qualified, MME establishes default bearing for RN in S-GW/P-GW and send initial context setup request message to DeNB for setting up RN context in DeNB; then DeNB sends RRC connection reconfiguration message to RN and carry the attach acceptance message sent by MME to RN which returns to RRC connection reconfiguration for finishing confirmation. In such way, RN establishes the basic IP connection. Later, O&M (Operation and Maintenance) downloads the node configuration information to RN to configure RN. Then RN establishes necessary S1 interface and X2 interface to enable normal work like base station.

The process of wiring UE into RN for attachment is as shown in FIG. 3: UE establishes RRC connection with RN and send attach request message to MME. RN carries such NAS message in initial UE message and send it to DeNB. After receiving, DeNB will modifies the eNB UE S1-AP ID1 therein into eNB UE S1-AP ID2 distributed for UE and send the message to proper MME in accordance with GUMMEI (Globally Unique MME Identifier) information indication or MME selection function. After receiving initial UE message, MME distributes one MME UE S1-AP ID3 for the UE and save it with the received eNB UE S1-AP ID2 correspondingly. MME UE S1-AP ID3 only identifies one UE in one MME, then MME distinguishes UE based on the MME UE S1-AP ID3 in received S1-AP message. MME sends initial context setup request message to the affiliated DeNB of RN, and DeNB replaces the received MME UE S1-AP ID3 by its own distributed MME UE S1-AP ID4, then saves it with eNB UE S1-AP ID2 distributed for UE and eNB UE S1-AP ID1 for UE by RN correspondingly. Later, DeNB transfers the initial context setup request message to RN for setting up UE context in RN, then RN saves the eNB UE S1-AP ID1 distributed for UE together with the received MME UE S1-AP ID4 correspondingly. After that, RN send initial context setup response message to MME for confirmation. During UE attach, correspondence of each node saving is given in Table 1. In follow-up process, through the mapping relationship established in UE attach, DeNB can find MME message (GUMMEI) for R-UE (UE under relay) connection according to UE AP-ID information. GUMMEI information refers to globally unique MME identifier, comprising PLMN (Public Land Mobile Network) ID, MME Group ID and MME code, with each GUMMEI corresponding to unique MME. Therein, correspondence of each node saving is as shown in Table 1

TABLE 1

| RN | DeNB | MME |
|---|---|---|
| eNB UE S1-AP ID1 (RN distribution) | eNB UE S1-AP ID1 (RN distribution) | |
| | eNB UE S1-AP ID2 (DeNB distribution) | eNB UE S1-AP ID2 (DeNB distribution) |
| | MME UE S1-AP ID3 (MME distribution) | MME UE S1-AP ID3 (MME distribution) |
| MME UE S1-AP ID4 (DeNB distribution) | MME UE S1-AP ID4 (DeNB distribution) GUMMEI | |

It can be learnt from the process mentioned above, DeNB is functioned by S1/X2 AP agency, only one S1 interface and X2 interface respectively exist between RN and DeNB, DeNB is connected with many MME/S-GWs, DeNB is in charge of MME control node selection function of R-UE, and RN is not informed of the MME information connected to R-UE. However, RN needs to acquire such information for judging handover type and MME correct addressing, hence a scheme for enabling RN to acquire the MME information connected to R-UE is required.

SUMMARY OF THE INVENTION

The embodiments of the present invention put forward a method, device and system for acquisition of control node information, to make the relay node acquire the control node information on user terminal access.

The embodiments of the present invention provide a method for acquiring control node information, which comprises:

Receive messages sent by base station and acquire the control node information on user terminal access attached in the information acquired.

The embodiments of the present invention provide a relay node, which comprises:

A receiving unit for receiving messages sent by base station;

An acquisition unit for acquiring control node information on user terminal access attached in the information acquired.

The embodiments of the present invention provide a method for acquiring control node information, which comprises:

Send messages carrying the control node information on user terminal access to relay nodes.

The embodiments of the present invention provide a base station, which comprises:

A sending unit for sending messages carrying the control node information on user terminal access to relay nodes.

The embodiments of the present invention provide a system for acquiring control node information, which comprises:

A base station for sending messages carrying the control node information on user terminal access;

A relay node for receiving messages carrying the control node information on user terminal access and acquire such information attached in the information acquired.

The embodiments of the present invention provide a method for acquiring control node information, which comprises:

Receive messages carrying the control node information on user terminal access sent by mobility management entities;

Acquire the control node information on user terminal access attached in the information acquired and send such information to relay nodes.

The embodiments of the present invention provide a base station, which comprises:

A Receiving unit for receiving the messages carrying the control node information on user terminal access sent by the mobility management entity;

A sending unit for acquiring control node information of the user terminal access carried in the message and sending such information to the relay node.

The embodiments of the present invention provide a method for acquiring control node information, which comprises:

Send the message carrying the control node information on user terminal access to the base station.

The embodiments of the present invention provide a mobility management entity, which comprises:

A sending unit for sending the message carrying the control node information on user terminal access to the base station.

The embodiments of the present invention provide a system for acquiring control node information, which comprises:

A mobility management entity for sending the message carrying the control node information on user terminal access to the base station.

A base station for receiving the message carrying the control node information on user terminal access sent by mobility management entities, acquiring the control node information on user terminal access attached in the information acquired and sending such information to relay nodes;

A relay node for receiving the messages carrying the control node information on user terminal access sent by the base station and acquiring the control node information on user terminal access attached in the information acquired.

Compared with the present technology, the embodiments of the present invention at least possess the following advantages:

In embodiments of the present invention, on the basis of information transmitted by a base station, a relay node acquires control node information on user terminal access attached in the information acquired, thereby allowing a relay node in a system placed after the introducing relay node to be informed of the control node information on user terminal access.

BRIEF DESCRIPTION OF THE DRAWINGS

To more clearly explain the technical proposal in the embodiments of the present invention or present technology, attached drawings required in the embodiments of the present invention or present technology description shall be simply introduced below. Obviously, drawings described below are only some embodiments of the present invention, and for ordinary technicians of this field, they can also acquire other attached drawings based on these drawings on the premise of paying no creative work.

DETAILED DESCRIPTION OF PREFERRED EMBODIMENTS

The technical solutions in the present invention are explained in a clear and complete way with reference to the drawings in the present invention. Obviously, the embodiments described hereinbelow are only part of embodiments of the present invention rather than all. All other embodiments gained by those skilled in the art on the basis of the embodiments in the present invention without any creative work shall fall within the protection scope of the present invention.

Embodiment I

Figure 1A:
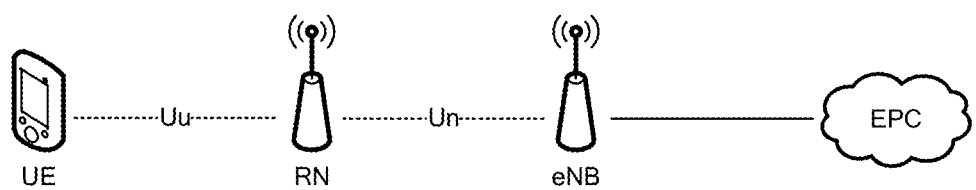
FIG. 1a is LTE-A system network architecture diagram with deployed RN in current technology.
Figure 1B:
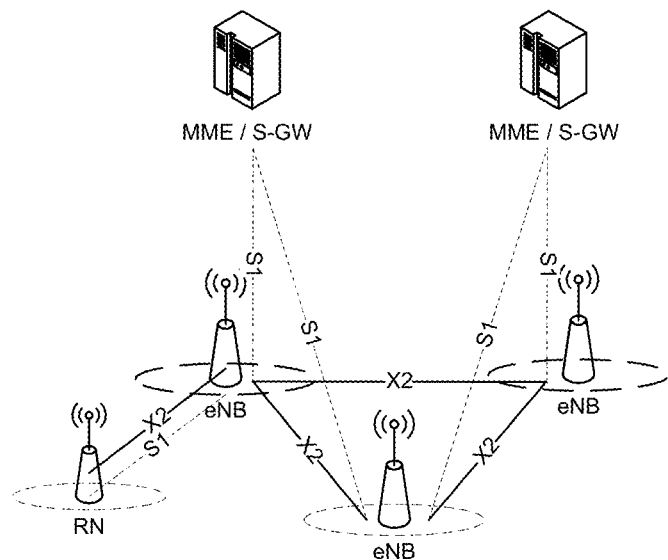
FIG. 1b is LTE-A system structure diagram with deployed RN in current technology.
Figure 2:
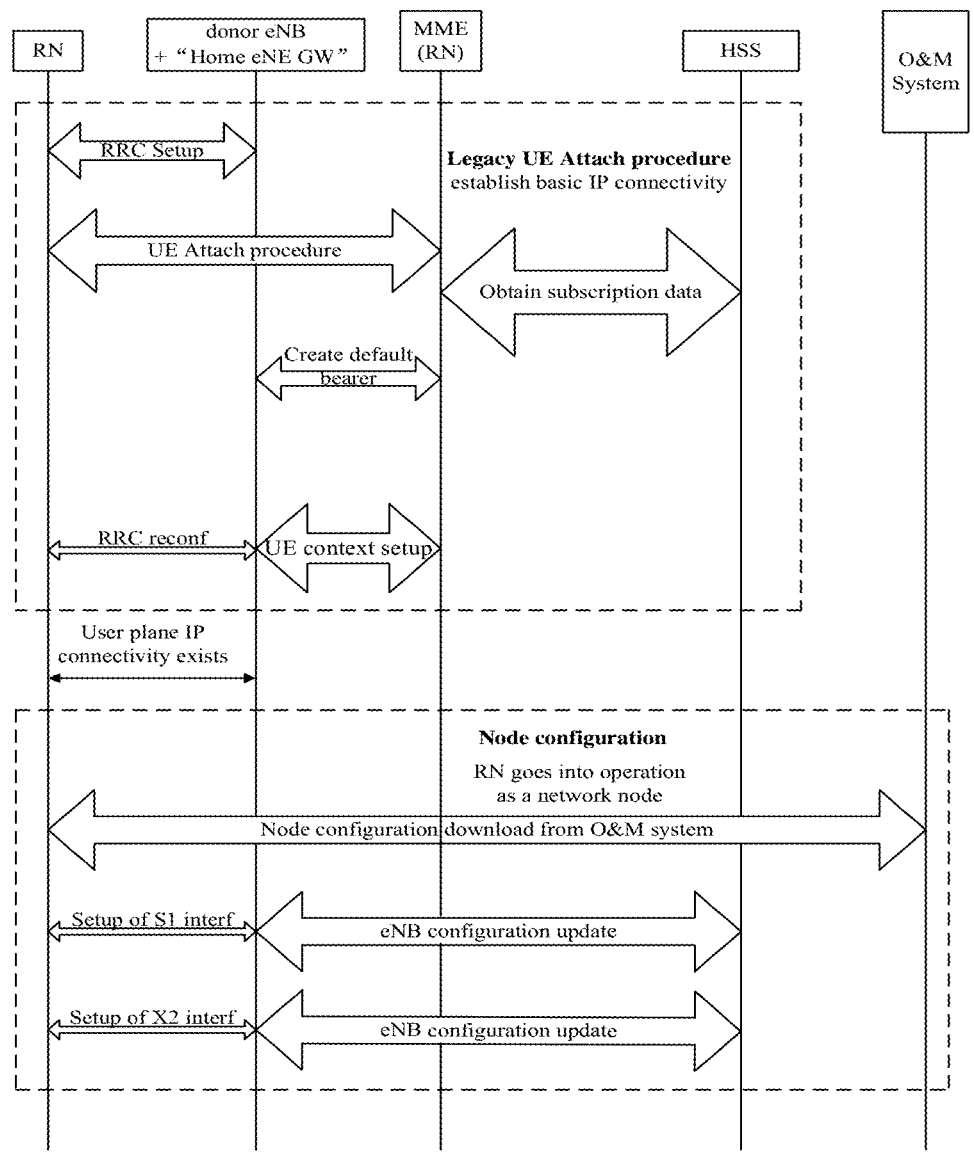
FIG. 2 is the diagram of RN start-up procedure in current technology.
Figure 3:
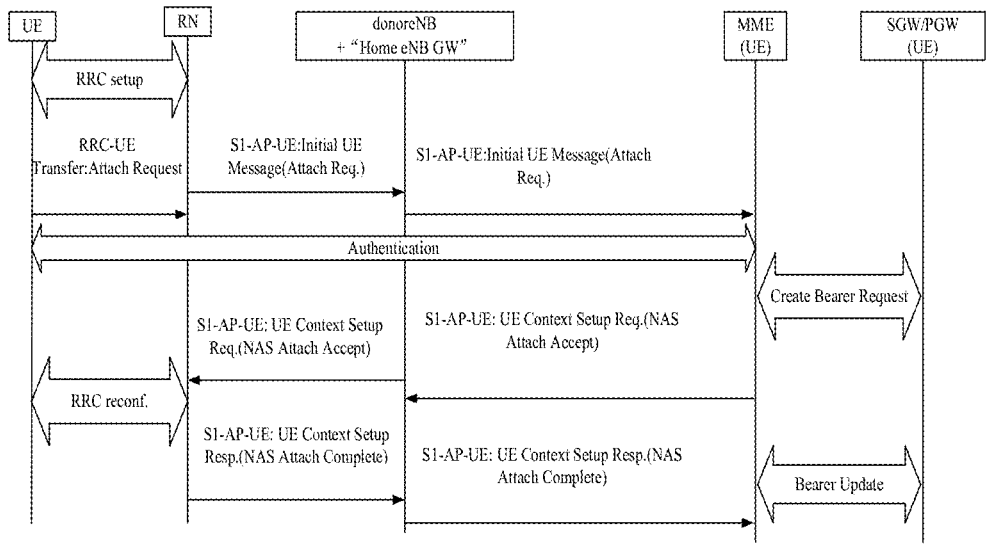
FIG. 3 is process diagram of RN attach with accessed UE in current technology.
Figure 4:
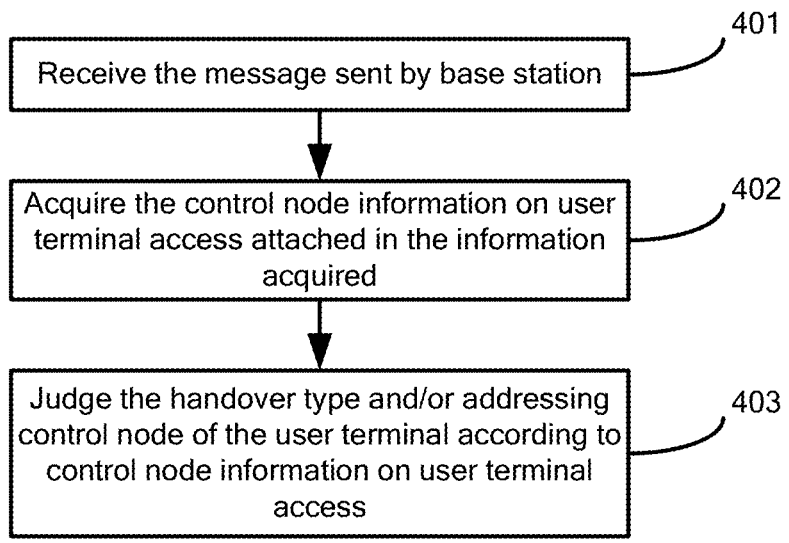
FIG. 4 is flow diagram of the method for acquiring control node information provided in Embodiment I of the present invention.

Embodiment I of the present invention provides a method for acquiring control node information, as shown in FIG. 4, which comprises:

Step 401: receive the message sent by base station;

The message sent by the receiving base station refers to: receiving S1 message sent by the base station, which comprises any of the following ones: initial context setup request message, user terminal context modification request message, handover request message and path switch request acknowledge message.

Message sent by the receiving base station can also be: receiving the predefined S1 or X2 message for carrying the control node information on user terminal access.

Before the receiving base station sends message, it can also comprise: the base station receives the S1 message sent by mobility management entity, which comprises any of the following ones: initial context setup request message, user terminal context modification request message, handover request message and path switch request acknowledge message.

Step 402: acquire the control node information on user terminal access attached in the information acquired.

Step 403: judge the handover type and/or addressing control node of the user terminal according to the control node information on user terminal access.

This control node information refers to MME information, i.e. GUMMEI information.

In Embodiment I, relay node returns S1-AP message or X2-AP message to base station and acknowledges acquisition of control node information after receiving the message sent by base station and saving GUMMEI information (control node information on user terminal access).

Embodiment II

Figure 5:
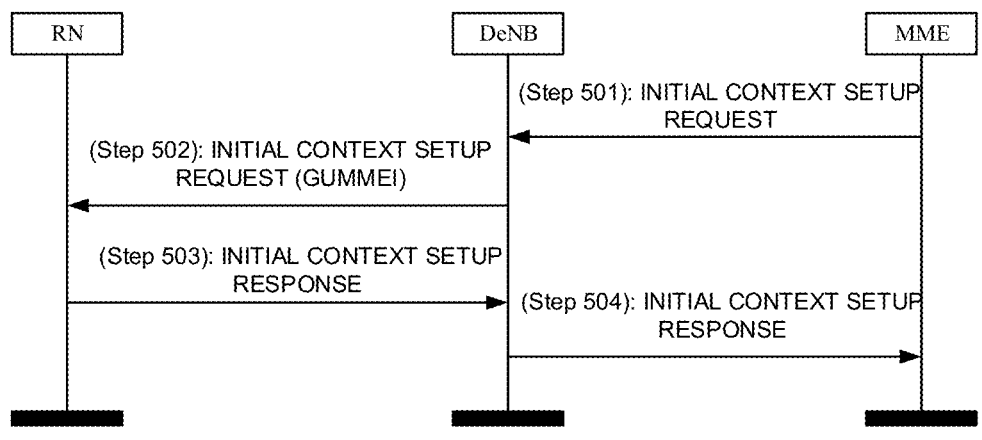
FIG. 5 is flow diagram of the method for acquiring control node information provided in Embodiment II of the present invention.

Embodiment II of the present invention provides a method for acquiring control node information to carry GUMMEI information in INITIAL CONTEXT SETUP REQUEST message, as shown in FIG. 5, which comprises:

Step 501: DeNB receives the INITIAL CONTEXT SETUP REQUEST message sent by MME and carries the MME information of R-UE connection (i.e. GUMMEI) in the message for transferring to RN.

Step 502: RN sets up UE context and saves GUMMEI information after receiving INITIAL CONTEXT SETUP REQUEST message.

Step 503: RN returns INITIAL CONTEXT SETUP RESPONSE message to DeNB and acknowledges acquisition of control node information.

Step 504: DeNB receives INITIAL CONTEXT SETUP RESPONSE message and transfers to MME.

Therein, specific setting up of INITIAL CONTEXT SETUP REQUEST message is as shown in Table 2:

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |

TABLE 2-continued

| IE/Group Name | Presence | Range | IE type and reference | Semantics description | Criticality | Assigned Criticality |
|---|---|---|---|---|---|---|
| E-RAB to Be Setup List | M | | | | YES | reject |
| >E-RAB to Be Setup Item IEs | | 1 to <maxnoofE-RABs> | | | EACH | reject |
| >>E-RAB ID | M | | 9.2.1.2 | | — | |
| >>E-RAB Level QoS Parameters | M | | 9.2.1.15 | Includes necessary QoS parameters | — | |
| >>Transport Layer Address | M | | 9.2.2.1 | | — | |
| >>GTP-TEID | M | | 9.2.2.2 | | — | |
| >>NAS-PDU | O | | 9.2.3.5 | | — | |
| UE Security Capabilities | M | | 9.2.1.40 | | YES | reject |
| Security Key | M | | 9.2.1.41 | The KeNB is provided after the key-generation in the MME, see [15] | YES | reject |
| Trace Activation | O | | 9.2.1.4 | | YES | ignore |
| Handover Restriction List | O | | 9.2.1.22 | | YES | ignore |
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| GUMMEI | O | | 9.2.3.9 | | YES | reject |

Embodiment III

Figure 6:
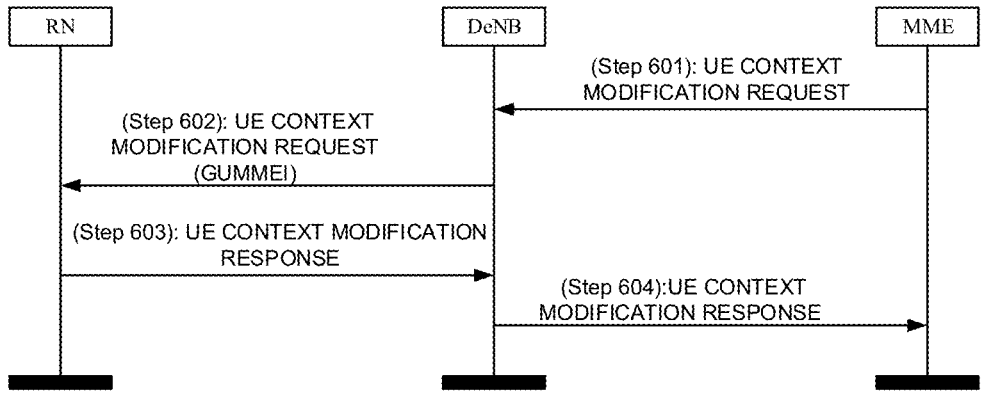
FIG. 6 is flow diagram of the method for acquiring control node information provided in Embodiment III of the present invention.

Embodiment III of the present invention provides a method for acquiring control node information to carry GUMMEI information in UE CONTEXT MODIFICATION REQUEST message, as shown in FIG. 6, which comprises:

Step 601: DeNB receives UE CONTEXT MODIFICATION REQUEST message sent by MME and carries MME information of R-UE connection (i.e. GUMMEI) in the message for transferring to RN.

Step 602: RN modifies the context and saves GUMMEI information after receiving UE CONTEXT MODIFICATION REQUEST message.

Step 603: RN returns UE CONTEXT MODIFICATION RESPONSE message to DeNB and acknowledges acquisition of control node information.

Step 604: DeNB receives UE CONTEXT MODIFICATION RESPONSE message and transfers to MME.

Therein, the specific IE setting up of UE CONTEXT MODIFICATION REQUEST message is as shown in Table 3:

TABLE 3

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| Security Key | O | | 9.2.1.41 | A fresh KeNB is provided after performing a key-change on the fly procedure in the MME, see [15] | YES | reject |
| Subscriber Profile ID for RAT/Frequency priority | O | | 9.2.1.39 | | YES | ignore |

TABLE 3-continued

| IE/Group Name | Presence | Range | IE type and reference | Semantics description | Criticality | Assigned Criticality |
|---|---|---|---|---|---|---|
| UE Aggregate Maximum Bit Rate | O | | 9.2.1.20 | | YES | ignore |
| CS Fallback Indicator | O | | 9.2.3.21 | | YES | reject |
| UE Security Capabilities | O | | 9.2.1.40 | | YES | reject |
| CSG Membership Status | O | | 9.2.1.73 | | YES | ignore |
| GUMMEI | O | | 9.2.3.9 | | YES | reject |

Embodiment IV

Figure 7:
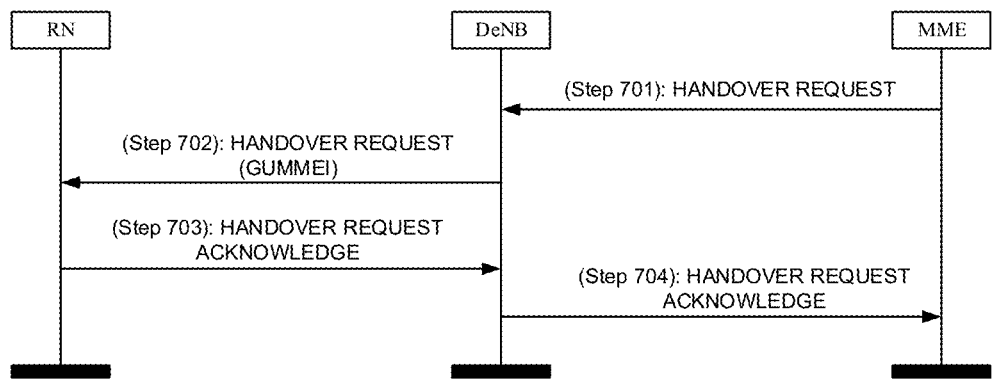
FIG. 7 is flow diagram of the method for acquiring control node information provided in Embodiment IV of the present invention.

Embodiment IV of the present invention provides a method for acquiring control node information to carry GUMMEI information in HANDOVER REQUEST message, as shown in FIG. 7, which comprises:

Step 701: DeNB receives the S1-AP: HANDOVER REQUEST message sent by MME and carries MME information of R-UE connection in the message for transferring to RN.

Step 702: RN reserves resource for the UE requiring handover and saves GUMMEI information after receiving HANDOVER REQUEST message.

Step 703: RN returns HANDOVER REQUEST ACKNOWLEDGE message to DeNB and acknowledges acquisition of control node information.

Step 704: DeNB receives HANDOVER REQUEST ACKNOWLEDGE message and transfers to MME.

Therein, the specific IE setting up of HANDOVER REQUEST is as shown in Table 4:

TABLE 4

| IE/GroupName | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| Handover Type | M | | 9.2.1.13 | | YES | reject |
| Cause | M | | 9.2.1.3 | | YES | ignore |
| UE Aggregate Maximum Bit Rate | M | | 9.2.1.20 | | YES | reject |
| E-RABs To Be Setup List | M | | | | YES | reject |
| >E-RABs To Be Setup Item IEs | | 1 to <maxnoofE-RABs> | | | EACH | reject |
| >>E-RAB ID | M | | 9.2.1.2 | | — | |
| >>Transport Layer Address | M | | 9.2.2.1 | | — | |
| >>GTP-TEID | M | | 9.2.2.2 | To deliver UL PDUs | — | |
| >>E-RAB Level QoS Parameters | M | | 9.2.1.15 | Includes necessary QoS parameters | — | |
| >>Data Forwarding Not Possible | O | | 9.2.1.76 | | YES | ignore |
| Source to Target Transparent Container | M | | 9.2.1.56 | | YES | reject |
| UE Security Capabilities | M | | 9.2.1.40 | | YES | reject |
| Handover Restriction List | O | | 9.2.1.22 | | YES | ignore |
| Trace Activation | O | | 9.2.1.4 | | YES | ignore |
| Request Type | O | | 9.2.1.34 | | YES | ignore |
| SRVCC Operation Possible | O | | 9.2.1.58 | | YES | ignore |

TABLE 4-continued

| IE/GroupName | Presence | Range | IE type and reference | Semantics description | Criticality | Assigned Criticality |
|---|---|---|---|---|---|---|
| Security Context | M | | 9.2.1.26 | | YES | reject |
| NAS Security Parameters to E-UTRAN | C-iffromUTRANGERAN | | 9.2.3.31 | The eNB shall use this IE as specified in [15]. | YES | reject |
| CSG Id | O | | 9.2.1.62 | | YES | reject |
| CSG Membership Status | O | | 9.2.1.73 | | YES | ignore |
| GUMMEI | O | | 9.2.3.9 | | YES | reject |

Embodiment V

Figure 8:
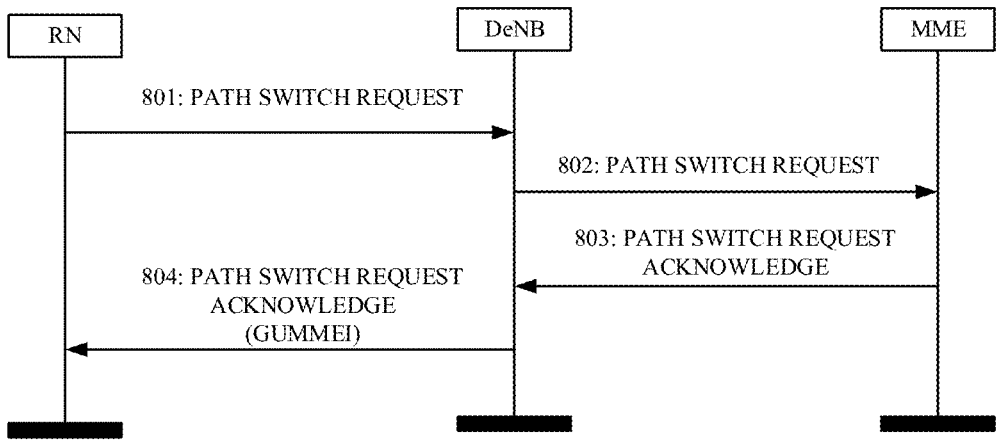
FIG. 8 is flow diagram of the method for acquiring control node information provided in Embodiment V of the present invention.

Embodiment V of the present invention provides a method for acquiring control node information to carry GUMMEI information in PATH SWITCH REQUEST ACKNOWLEDGE message, as shown in FIG. 8, which comprises:

Step 801: RN send PATH SWITCH REQUEST message to DeNB and request to exchange downlink GTP tunnel to the new GTP tunnel endpoint.

Step 802: DeNB receives the PATH SWITCH REQUEST message sent by destination RN and transfers the PATH SWITCH REQUEST message to MME.

Step 803: DeNB receives the PATH SWITCH REQUEST ACKNOWLEDGE message sent by MME and carries MME information of R-UE connection when returning PATH SWITCH REQUEST ACKNOWLEDGE message to RN.

Step 804: RN receives PATH SWITCH REQUEST ACKNOWLEDGE message and saves GUMMEI information.

Therein, the specific IE setting up of PATH SWITCH REQUEST ACKNOWLEDGE is as shown in Table 5:

TABLE 5

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| UE Aggregate Maximum Bit Rate | O | | 9.2.1.20 | | YES | ignore |
| E-RAB To Be Switched in Uplink List | O | | | | YES | ignore |
| >E-RABs Switched in Uplink Item IEs | | 1 to <maxnoofE-RABs> | | | EACH | ignore |
| >>E-RAB ID | M | | 9.2.1.2 | | — | |
| >>Transport Layer Address | M | | 9.2.2.1 | | — | |
| >>GTP-TEID | M | | 9.2.2.2 | | — | |
| E-RAB To Be Released List | O | | E-RAB List 9.2.1.36 | a value for E-RAB ID shall only be present once in E-RAB To Be Switched in Uplink List IE + E-RAB to Be Released List IE | YES | ignore |
| Security Context | M | | 9.2.1.26 | One pair of {NCC, NH} is provided | YES | reject |
| Criticality Diagnostics | O | | 9.2.1.21 | | YES | ignore |
| GUMMEI | O | | 9.2.3.9 | | YES | reject |

Embodiment VI

Figure 9:
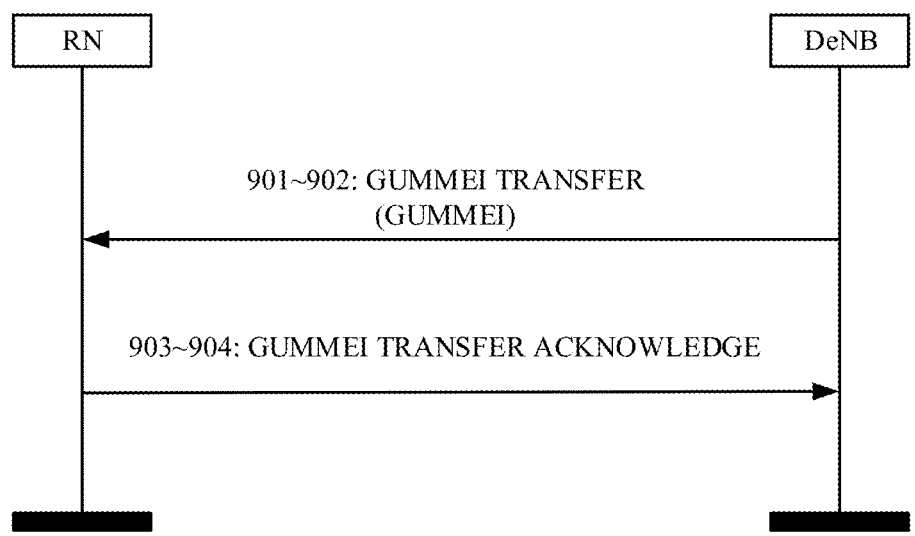
FIG. 9 is flow diagram of the method for acquiring control node information provided in Embodiment VI of the present invention.

Embodiment VI of the present invention provides a method for acquiring control node information to define the new S1-AP or X2-AP process which is specially used for informing GUMMEI information to RN by DeNB on Un interface, as shown in FIG. 9, which comprises:

Step 901: DeNB sends GUMMEI TRANSFER message to RN for informing MME information of R-UE connection.

Step 902: RN receives GUMMEI TRANSFER message and saves GUMMEI information.

Step 903: RN returns GUMMEI TRANSFER ACKNOWLEDGE message to DeNB and confirms the receiving of GUMMEI.

Step 904: DeNB receives GUMMEI TRANSFER ACKNOWLEDGE message.

Available steps before step 901 can also comprise: RN sends GUMMEI TRANSFER REQUEST message to DeNB and request for MME information of R-UE connection.

Embodiment VII

Figure 10:
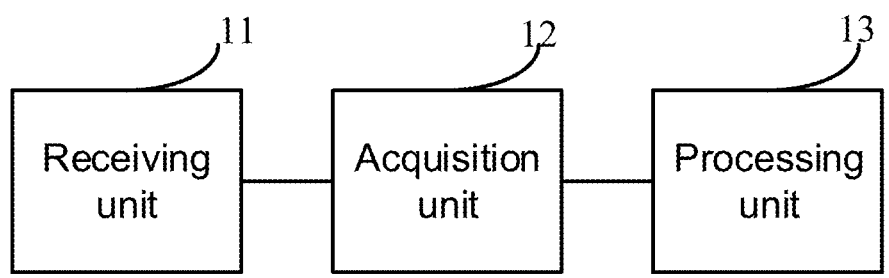
FIG. 10 is structure diagram of relay node provided in Embodiment VII of the present invention.

Embodiment VII of the present invention provides a relay node, as shown in FIG. 10, which comprises:

A receiving unit 11 for receiving messages sent by base station;

An acquisition unit 12 for acquiring control node information on user terminal access attached in the information acquired.

The receiving unit 11 is also used to: receive S1 message sent by base station, which comprises any of the following ones:

Initial context setup request message, user terminal context modification request message, handover request message and path switch request acknowledge message.

The receiving unit 11 is also used to:

Receive the predefined S1 or X2 message carrying control node information on user terminal access.

It also comprises processing unit 13 for judging the handover type and/or addressing control node of the user terminal according to the control node information on user terminal access.

Embodiment VIII

Figure 11:
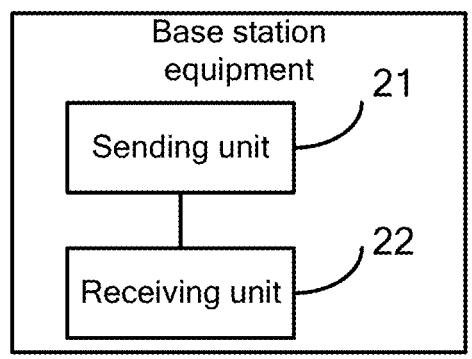
FIG. 11 is structure diagram of base station provided in Embodiment VIII of the present invention.

Embodiment VIII of the present invention provides a base station, as shown in FIG. 11, which comprises:

A sending unit 21 for sending messages carrying the control node information on user terminal access to relay nodes.

The base station can also comprise: receiving unit 22 for receiving S1 message sent to base station by mobility management entity, which comprises any of the following ones:

Initial context setup request message, user terminal context modification request message, handover request message and path switch request acknowledge message.

The sending unit 21 is also used to: send S1 message to relay node, which comprises any of the following ones:

Initial context setup request message, user terminal context modification request message, handover request message and path switch request acknowledge message.

The sending unit 21 is also used to: send the predefined S1 or X2 message for carrying the control node information on user terminal access to relay node.

Embodiment IX

Embodiment IX of the present invention provides a system for acquiring control node information, which comprises:

A base station for sending messages carrying the control node information on user terminal access;

A relay node for receiving messages carrying the control node information on user terminal access and acquiring the control node information on user terminal access attached in the information acquired.

In embodiments of the present invention, on the basis of information transmitted by a base station, a relay node acquires control node information on user terminal access attached in the information acquired, thereby allowing a relay node in a system placed after the introducing relay node to be informed of control node information on user terminal access.

Embodiment X

Figure 12:
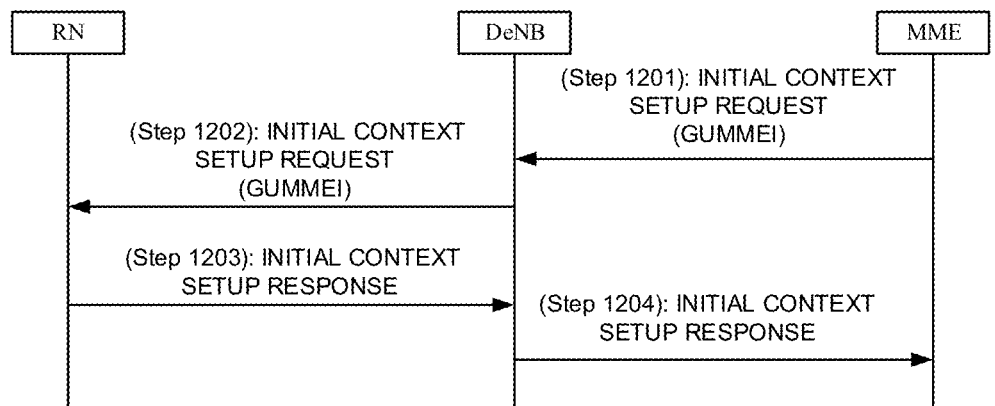
FIG. 12 is flow diagram of the method for acquiring control node information provided in Embodiment X of the present invention.

Embodiment X of the present invention provides a method for acquiring control node information to carry GUMMEI information in INITIAL CONTEXT SETUP REQUEST message, as shown in FIG. 12, which comprises:

Step 1201: MME carries MME information of R-UE connection (i.e. GUMMEI) in INITIAL CONTEXT SETUP REQUEST message and sends to DeNB.

Step 1202: RN sete up UE context and saves GUMMEI information after receiving INITIAL CONTEXT SETUP REQUEST transferred by DeNB.

Step 1203: RN returns INITIAL CONTEXT SETUP RESPONSE message to DeNB and acknowledges acquisition of control node information.

Step 1204: DeNB receives INITIAL CONTEXT SETUP RESPONSE message and transfers to MME.

Embodiment XI

Figure 13:
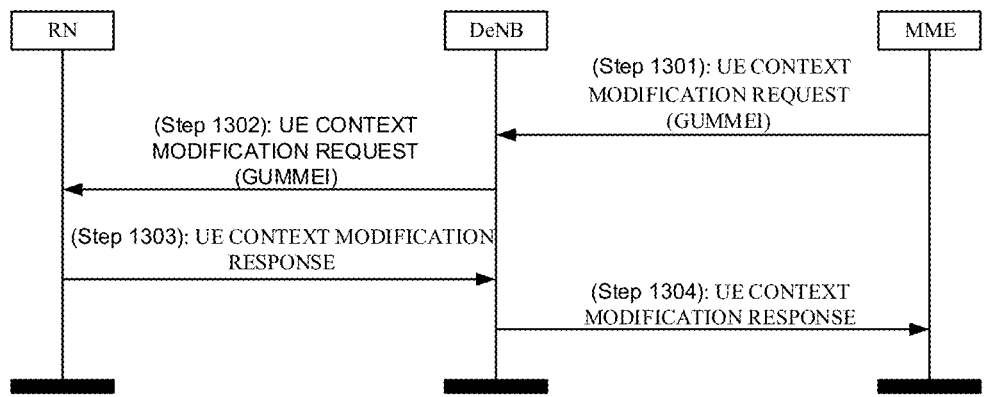
FIG. 13 is flow diagram of the method for acquiring control node information provided in Embodiment XI of the present invention.

Embodiment XI of the present invention provides a method for acquiring control node information to carry GUMMEI information in UE CONTEXT MODIFICATION REQUEST message, as shown in FIG. 13, which comprises:

Step 1301: MME carries MME information of R-UE connection (i.e. GUMMEI) in UE CONTEXT MODIFICATION REQUEST message and sends to DeNB.

Step 1302: RN modifies UE context and saves GUMMEI information after receiving UE CONTEXT MODIFICATION REQUEST transferred by DeNB.

Step 1303: RN returns UE CONTEXT MODIFICATION RESPONSE message to DeNB and acknowledge acquisition of control node information.

Step 1304: DeNB receives UE CONTEXT MODIFICATION RESPONSE message and transfers to MME.

Embodiment XII

Figure 14:
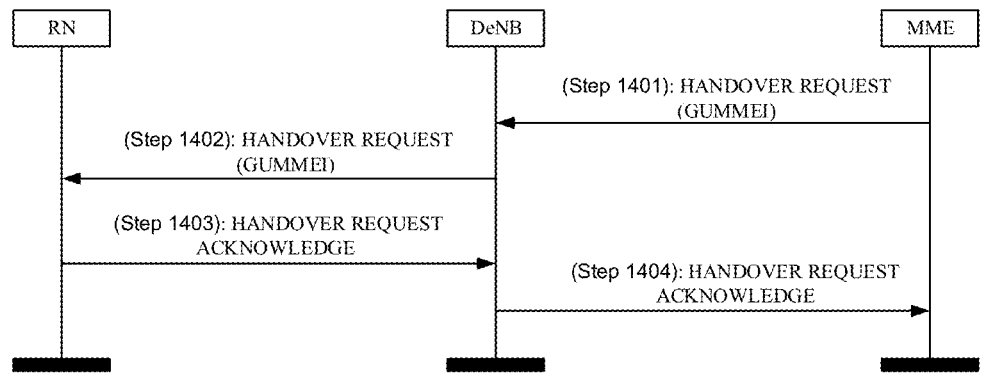
FIG. 14 is flow diagram of the method for acquiring control node information provided in Embodiment XII of the present invention.

Embodiment XII of the present invention provides a method for acquiring control node information to carry GUMMEI information in HANDOVER REQUEST message, as shown in FIG. 14, which comprises:

Step 1401: MME carries MME information of R-UE connection (i.e. GUMMEI) in S1-AP: HANDOVER REQUEST message and send to DeNB.

Step 1402: RN reserves resources for the UE requiring handover and saves GUMMEI information after receiving HANDOVER REQUEST message transferred by DeNB.

Step 1403: RN returns HANDOVER REQUEST ACKNOWLEDGE message to DeNB and acknowledges acquisition of control node information.

Step 1404: DeNB receives HANDOVER REQUEST ACKNOWLEDGE message and transfers to MME.

Embodiment XIII

Figure 15:
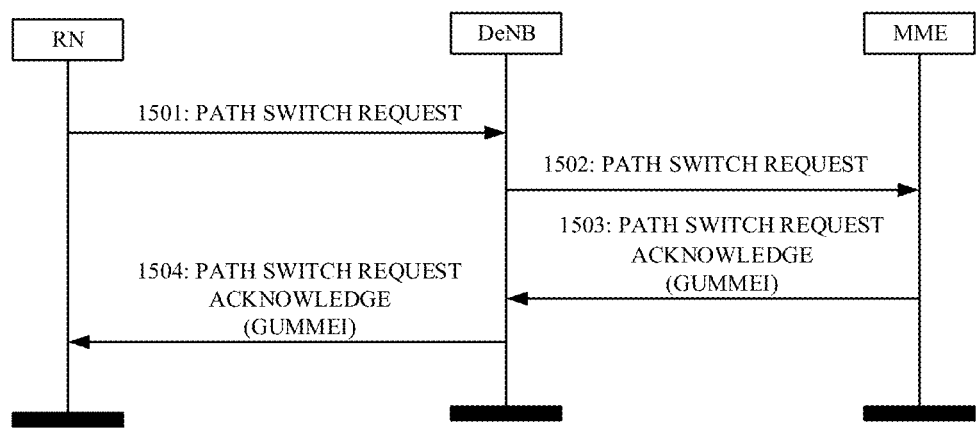
FIG. 15 is flow diagram of the method for acquiring control node information provided in Embodiment XIII of the present invention.

Embodiment XIII of the present invention provides a method for acquiring control node information to carry GUMMEI information in PATH SWITCH REQUEST ACKNOWLEDGE message, as shown in FIG. 15, which comprises:

Step 1501: RN send PATH SWITCH REQUEST message to DeNB and request to exchange downlink GTP tunnel to the new GTP tunnel endpoint.

Step 1502: DeNB receives the PATH SWITCH REQUEST message sent by destination RN and transfers the PATH SWITCH REQUEST message to MME.

Step 1503: MME carries MME information of R-UE connection (i.e. GUMMEI) in PATH SWITCH REQUEST ACKNOWLEDGE message and sends to DeNB.

Step 1504: RN receives PATH SWITCH REQUEST ACKNOWLEDGE message transferred by DeNB and saves GUMMEI information.

Embodiment XIV

Figure 16:
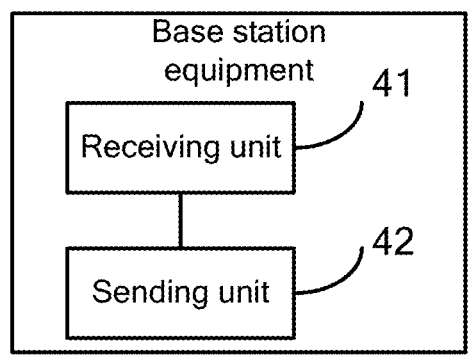
FIG. 16 is the structure diagram of base station provided in Embodiment XIV of the present invention.

Embodiment XIV of the present invention provides a base station, as shown in FIG. 16, which comprises:

Receiving unit 41 for receiving the message carrying control node information on user terminal access sent by mobility management entity to base station.

The message refers to S1 message, which comprises any of the following ones:

Initial context setup request message, user terminal context modification request message, handover request message and path switch request acknowledge message.

A sending unit 42 for acquiring control node information of the user terminal access carried in the message and sending such information to the relay node.

It is sent to relay node by S1 message carrying the control node information on user terminal access, which comprises any of the following ones:

Initial context setup request message, user terminal context modification request message, handover request message and path switch request acknowledge message.

Embodiment XV

Figure 17:
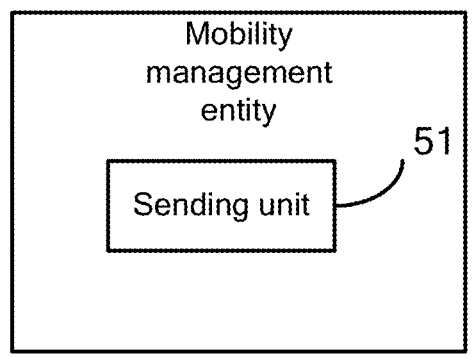
FIG. 17 is the structure diagram of mobility management entity provided in Embodiment XV of the present invention.

Embodiment XV of the present invention provides a mobility management entity, as shown in FIG. 17, which comprises:

A sending unit 51 for sending the message carrying the control node information on user terminal access to the base station.

The message refers to S1 message, which comprises any of the following ones:

Initial context setup request message, user terminal context modification request message, handover request message and path switch request acknowledge message.

Embodiment XVI

Embodiment XVI of the present invention provides a system of acquiring control node information, which comprises:

A movable management entity for sending the message carrying the control node information on user terminal access to the base station.

A base station for receiving the message carrying the control node information on user terminal access sent by movable management entities, acquiring the control node information on user terminal access attached in the information acquired and sending such information to relay nodes;

A relay node for receiving the messages carrying the control node information on user terminal access sent by the base station and acquiring the control node information on user terminal access attached in the information acquired.

In the embodiments of the present invention, a mobility management entity sends the message carrying the control node information on user terminal access to base station, while on the basis of information transmitted by a base station, a relay node acquires control node information on user terminal access attached in the information acquired, thereby allowing a relay node in a system placed after the introducing relay node to be informed of the control node information on user terminal access.

With the description of the preferred embodiments hereinabove, those skilled in the art can clearly understand that the present invention can be realized with the aid of software and necessary commonly used hardware platforms, or the aid of hardware of course, but the former is a preferred embodiment in most cases. Based on this understanding, the technical proposal of the present invention or the part contributing to the present technology can be reflected in the form of a software product, which is saved in a memory medium comprising instructions to enable a terminal equipment, which could be a personal computer, a server or a network device, to carry out the methods for each embodiment of the present invention.

Technical personnel of the field can understand that the drawings only refer to the diagram of a preferred embodiment, and the module or procedure is not necessary for the implementation of the embodiments of the present invention.

Technical personnel of the field can understand that the module in the unit of an embodiment can be distributed in such unit based on embodiment description, or located in one or more units of another embodiment through corresponding changes. Modules of the embodiments mentioned above can be merged into one module, or further divided into a plurality of submodules.

The number of the aforementioned embodiments of the present invention is only used for description rather than for representing advantages or disadvantages.

Only several specific embodiments of the present invention are released above. However, the present invention is not only comprised of those. Any changes that technical personnel of the field can predict are still under the scope of the present invention.

The invention claimed is:

1. A method for acquisition of information of a control node, comprising:

receiving, by a relay node (RN) that needs to acquire information of an MME to which one UE under the relay node accesses for judging a handover type and/or MME correct addressing but the relay node is not informed of the information of the MME to which the one UE under the relay node accesses, through wireless network, a message sent by a base station and acquiring, by the relay node, information of one control node to which the one UE under the relay node accesses, wherein the information of the one control node is carried in the message and the information of the one control node is the information of the MME to which the one UE under the relay node accesses; and determining a handover type and/or addressing the one control node to which the one UE under the relay node accesses according to the information of the one control node to which the one UE under the relay node accesses;

wherein the receiving, by the relay node through wireless network, the message sent by the base station further comprising:

receiving, by the relay node, a predefined S1 or X2 message carrying the information of the one control node to which the one UE under the relay node accesses.

2. The method as claimed in claim 1, wherein the receiving, by the relay node through wireless network, the message sent by the base station comprising:

receiving, by the relay node, an S1 message sent by the base station, wherein the S1 message comprises any of:

an initial context setup request message, a user terminal context modification request message, a handover request message, or a path switch request acknowledge message.

3. A relay node (RN) that needs to acquire information of an MME to which one UE under the relay node accesses for judging a handover type and/or MME correct addressing but the relay node is not informated of the information of the MME to which the one UE under the relay node accesses, comprising a computer processor and a computer-readable storage medium which stores a plurality of competer-executable instructions, wherein the computer-executable instructions, when being executed by the computer processor, cause the computer processor to:

receive a message sent by a base station through wireless network;

acquire information of one control node to which the one UE under the relay node accesses, wherein the information of the one control node is carried in the message and the information of the one control node is the information of the MME to which the one UE under the relay node accesses; and determine a handover type and/or addressing the one control node to which the one UE under the relay node accesses according to the information of the one control node to which the one UE under the relay node accesses;

wherein the computer-executable instructions, when being executed by the computer processor, further cause the computer processor to:

receive a predefined S1 or X2 message carrying the information of the one control node to which the one UE under the relay node accesses.

4. The relay node as claimed in claim 3, wherein the computer-executable instructions, when being executed by the computer processor, further cause the computer processor to:

receive an S1 message sent by the base station, the S1 message comprising any of:

an initial context setup request message, a user terminal context modification request message, a handover request message, or a path switch request acknowledge message.

5. A system for acquiring information of a control node, comprising:

a base station, which is used for sending a message carrying information of one control node to which one UE under a relay node (RN) accesses;

the relay node which needs to acquire infomration of an MME to which the one UE under the relay node accesses for juding a handover type and/or MME correct addressing but the relay node is not informated of the information of the MME to which the one UE under the relay node accesses, and which is used for receiving the message carrying the information of the one control node to which the one UE under the relay node accesses through wireless network, acquiring the information of the one control node to which the one UE under the relay node accesses carried in the message and determining a hadnover type and/or addressing the one control node to which the one UE under the relay node accesses according to the information of the one control node to which the one UE under the relay node accesses;

wherein the information of the one control node is the information of the MME to which the one UE under the relay node accesses;

wherein the base station comprises a computer processor and a computer-readable storage medium which stores a plurality of computer-executable instructions, wherein the computer-executable instructions, when being executed by the computer processor, cause the computer processor to sned, to the relay node, a predefined S1 or X2 message carrying the information of the one control node to which the one UE under the relay node accesses.

6. The system as calimed in claim 5, wherein the computer-executable instructions, when being executed by the computer processor, further cause the computer processor to:

send, to the relay node, the message carrying the information of the one control node to which the one UE under the relay node accesses.

7. The system as claimed in claim 6, wherein the computer-executable instructions, when being executed by the computer processor, further cuast the computer processor to:

receive an S1 message sent to the base station by a mobility management entity, the S1 message comprising any of:

an initial context setup request message, a user terminal context modification request message, a handover request message, or a path switch request acknowledge message.

8. The system as claimed in claim 7, wherein the computer-executable instructions, when being executed by the computer processor, further cause the computer processor to send an S1 message to the relay node, the S1 message comprising any of:

an initial context setup request message, a user terminal context modification request message, a handover request message, or a path switch request acknowledge message.

9. A system for acquiring information of a control node, comprising:

a mobility management entity for sending through wireless network, to a base station, a message carrying information of one control node to which one UE under a relay node (RN) accesses;

the bases station, which is for receiving the message carrying the information of the one control node to which the one UE under the relay node accesses sent by the mobility management entity, acquiring the information of the one control node to which the one UE under the relay node accesses carried in the message, and sending the information of the one control node to the relay node; and the relay node which needs to acquire information of an MME to which the one UE under the relay mode accesses for juding a handover type and/or MME correct addressing but the relay node is not informed of the information of the MME to which the one UE under the relay node accesses, and which is for receiving a message which is sent by the base station and carries the information of the one control node to which the one UE under the relay node accesses, acquiring the information of said the one control node to which the one UE under the relay node accesses carried in the message sent by the base station, and determining a handover type and/or addressing the one control node to which the one UE under the relay node accesses according to the information of the one control node to which the one UE under the relay node accesses;

wherein the information of the one control node to which the one UE under the relay node accesses is the information of the MME to which the one UE under the relay mode accesses;

wherein the bases station comprises a computer processor and a computer-readable storage medium which stores a plurality of computer-executable instructions, wherein the computer-executable instructions, when being executed by the computer processor, cause the computer processor to send, to the realy node, a pre-defined S1 or X2 message carrying the information of the one control node to which the one UE under the relay node accesses.

* * * * *